United States Patent [19]

Horii

[11] Patent Number: 4,660,526
[45] Date of Patent: Apr. 28, 1987

[54] CONTROL DEVICE FOR CONTROLLING THE OPERATION OF A SUPERCHARGER IN AN INTERNAL COMBUSTION ENGINE

[75] Inventor: Kingo Horii, Susono, Japan

[73] Assignee: Toyota Jidosha Kabushiki Kaisha, Aichi, Japan

[21] Appl. No.: 829,064

[22] Filed: Feb. 13, 1986

[30] Foreign Application Priority Data

Feb. 15, 1985 [JP] Japan .................................. 60-26480

[51] Int. Cl.⁴ ............................................ F02B 33/38
[52] U.S. Cl. .................................................. 123/559
[58] Field of Search ................................ 123/559, 564

[56] References Cited

U.S. PATENT DOCUMENTS

| | | | |
|---|---|---|---|
| 4,485,793 | 12/1984 | Oguma ................................ | 123/559 |
| 4,556,038 | 12/1985 | Okamoto et al. .................... | 123/564 |
| 4,589,396 | 5/1986 | Tokushima et al. ............ | 123/564 X |
| 4,596,225 | 6/1986 | Oonaka et al. ....................... | 123/559 |

*Primary Examiner*—Michael Koczo
*Attorney, Agent, or Firm*—Parkhurst & Oliff

[57] ABSTRACT

A control device for controlling the operation of a mechanically driven supercharger in an internal combustion engine. The device comprises a first sensor means for detecting the temperature of the engine, a second sensor means for detecting racing of the engine, and a control means for causing an electromagnetic clutch arranged between the crankshaft and the supercharger to be disengaged when the temperature is below a predetermined value and the engine is racing.

7 Claims, 5 Drawing Figures

CONTROL DEVICE FOR CONTROLLING THE OPERATION OF A SUPERCHARGER IN AN INTERNAL COMBUSTION ENGINE

BACKGROUND OF THE INVENTION

1. Field of the Invention

The present invention relates to a control device for controlling the operation of a mechanically driven supercharger in an internal combustion engine.

2. Description of the Related Art

It is well known to equip an internal combustion engine with a mechanically driven supercharger which is driven by and mechanically connected to a crankshaft of the engine via an electromagnetic clutch (c.f., for example, Japanese Unexamined Patent Publication No. 56-167817). By selectively engaging or disengaging the electromagnetic clutch in response to the engine revolutions (rpm) and load, it is possible to reduce the driving loss of the engine by releasing the clutch when the engine rpm and load is low and to attain a high engine power due to the supercharging by engaging the clutch when the engine rpm and load are high. It is also possible to obtain a very rapid response during engine acceleration, as the electromagnetic clutch can be instantaneously turned on.

It is also known to increase the amount of fuel in the air/fuel ratio (i.e., enrich the A/F mixture) when the engine is cold. A problem arises in that if the engine is raced (i.e., wide-open throttle) when the engine is still cold, the engine rpm is abruptly increased when the engine is raced and the subsequent closure of the throttle causes a large vacuum to occur just downstream of the throttle valve, resulting in a phenomena wherein a part of the air introduced past the throttle valve is made to pulsate and return toward the throttle valve. The injected fuel also flows back toward the throttle valve together with the back-flow of air. This back-flowing fuel tends to be deposited on the internal wall of the air intake pipe, due to the cold condition of the engine. If the supercharger is operating, a larger amount of the air is introduced into the engine, which causes an accompanying increase in the amount of fuel introduced therein. Thus the proportion of back-flowing fuel becomes large. If the engine is accelerated (e.g., upon vehicle move-off) under such circumstances, the deposited fuel is instantaneously introduced into the engine together with the newly injected fuel. Thus an excessive amount of fuel is introduced into the engine; flooding the combustion chambers and making the spark plugs wet.

This can be avoided by stopping the operation of the supercharger, when the engine is cold. However, such a stoppage will bring a deterioration in the engine performance while the vehicle is running. The above-explained fuel back-flowing tendency becomes more remarkable if the throttle valve is arranged upstream of the supercharger, so that the volumetric area between the throttle valve and an intake valve becomes larger.

SUMMARY OF THE INVENTION

It is an object of the invention to solve the above problems by providing a control device for controlling the operation of a supercharger in an internal combustion engine, by which the operation of the supercharger is stopped when the engine is raced while the engine is cold.

According to the present invention, a control device is provided for controlling the operation of a supercharger equipped in an internal combustion engine, the supercharger being driven by and connected to a crankshaft of the engine via an electromagnetic clutch. The control device for controlling the operation of the supercharger in response to the engine operating conditions comprises, a first sensor means for detecting the temperature of the engine, a second sensor means for detecting racing by the engine, and a control means responsive to outputs from the first and second sensors for causing the electromagnetic clutch to be disengaged, thereby disconnecting the supercharger from the crankshaft when the temperature of the engine is below a predetermined value and the engine is racing.

BRIEF DESCRIPTION OF THE DRAWINGS

The present invention will be described in more detail by way of a preferred embodiment, with reference to the attached drawings, in which.

DESCRIPTION OF THE PREFERRED EMBODIMENT

Figure 1:
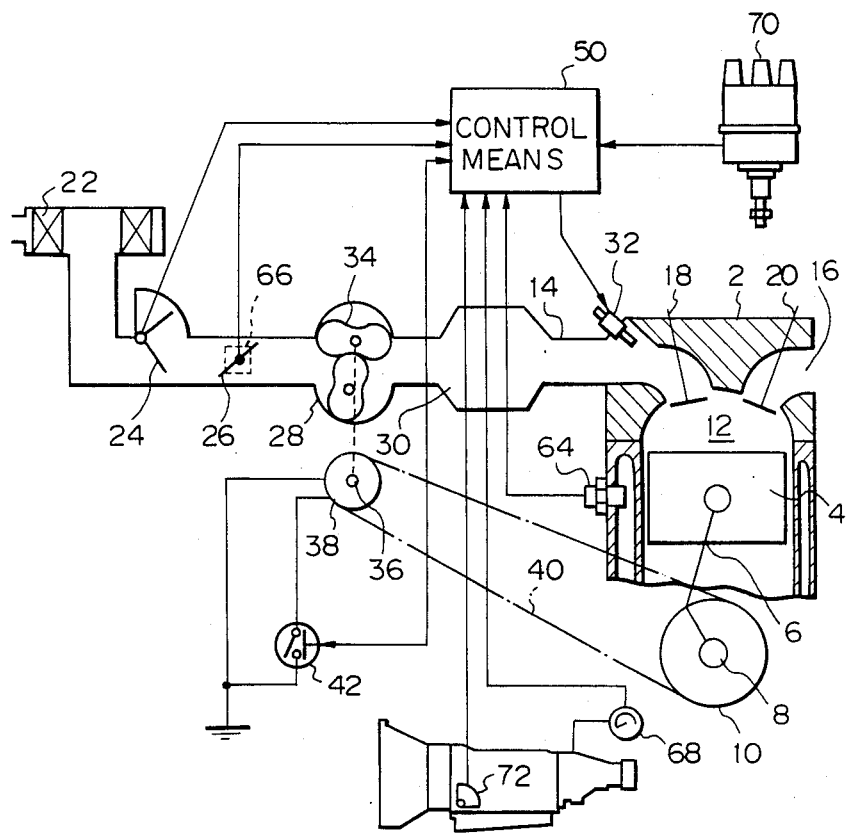
FIG. 1 shows an internal combustion engine according to the present invention.

Referring to FIG. 1, the cylinder body 2 has a conventional piston 4 slidably inserted therein. The piston 4 is connected to a crankshaft 8 by a connecting rod 6, and the crankshaft 8 has a crank pulley 10 secured thereto. A combustion chamber 12 is formed in the cylinder body 2 above the piston 4. An intake air passage 14 and an exhaust gas passage 16 are communicatingly connected to the combustion chamber 12, respectively. An intake valve 18 is arranged in the intake air passage 14, and an exhaust valve 20 is arranged in the exhaust passage 16. A spark plug (not shown) is also arranged in the cylinder block in a conventional manner.

Arranged on an intake passage 14, are an air cleaner 22, an air flow meter 24, a throttle valve 26, a supercharger 28 according to the present invention, a surge tank 30, and a fuel injector 32 in that order. The supercharger 28 comprises a Roots blower having a pair of rotors 34, each rotor 34 being supported on respective rotor- shafts 36. An electromagnetic clutch 38 is secured to one of the rotor shafts 36.. The electromagnetic clutch 38 has a primary pulley connected to the crank pulley 10 through a timing belt 40, and thus the supercharger 28 can be mechanically driven by the crankshaft 8. The supercharger 28 can comprise other types of air pumps, such as a vane pump.

Figure 2:
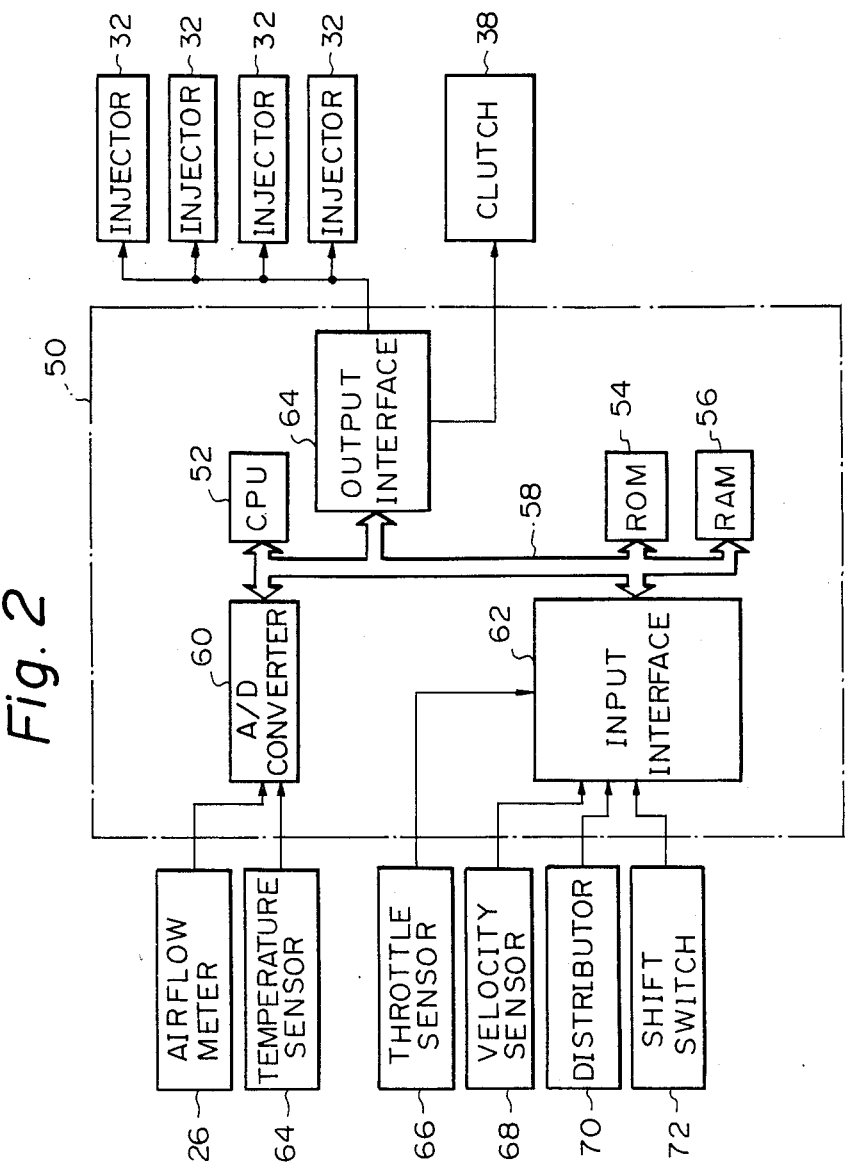
FIG. 2 shows a detailed arrangement of the control means in FIG. 1.

A relay 42 switches the electromagnetic clutch 38 ON or OFF to connect or release the cooperating clutch members. A control means 50 delivers control signals to the relay 42 and to the fuel injector 32. As shown in FIG. 2, the control means 50 is formed by a microcomputer system comprising a central processing unit (CPU) 52 having a control and arithmetic function, a read only memory (ROM) 54 storing a predetermined program, and a random access memory (RAM) 56 storing data from sensors. These members 52, 54, and 56 are interconnected by a bus 58 which further connects an analog digital (A/D) converter 60, an input interface 62, and an output interface 64. Data from the sensors is input through the analog-digital converter 60 and the input interface 62. The control signals are delivered to the fuel injectors 32 at each cylinder and to the electromagnetic clutch 38 through the output interface 64.

Figure 3:
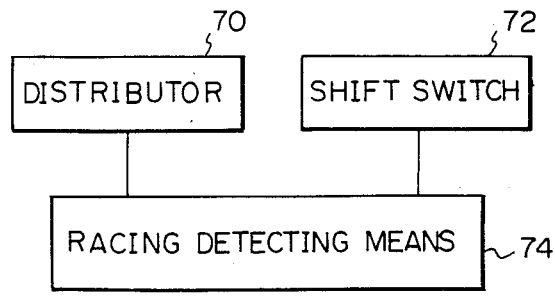
FIG. 3 illustrates a racing detecting means.

The input data is obtained by the sensors shown in FIG. 1, i.e., the air flow meter 26, a temperature sensor 64 for detecting the temperature of the engine cooling water, a throttle sensor 66 for detecting the position of the throttle valve 26, a velocity sensor 68 arranged on a drive shaft of a vehicle in which the engine is mounted, a sensor arranged on a distributor 70 for detecting the engine revolution (rpm) and the position of the crankshaft 8, a shift switch 72 arranged on a transmission of the vehicle for detecting, in particular, the time at which the transmission is in the neutral mode. These sensors are well known in the art and the control of the fuel injection can be achieved in a well known manner, accordingly a detailed description of such sensors and the control of the fuel injection is omitted. However, it is an important feature of the present invention that a racing detecting means is constituted by a combination of such sensors. 'Racing' is an engine operating condition in which an accelerator pedal is depressed under a no-load condition to increase the rpm of the engine, thus racing can be detected by appropriate combinations of the position of the throttle valve 26, the velocity of the vehicle, the rpm of the engine, and the mode of the transmission. One such combination is exemplified in FIG. 3, in which the racing detecting means 74 is constituted by the engine revolutions sensor on the distributor 70, and the shift switch 72. Racing can be detected if the engine rpm is above a predetermined value and the transmission is in the neutral mode. Alternatively, racing can be detected if the engine rpm is more than a predetermined value and the velocity of the vehicle is substantially zero. Further, racing can be detected if the opening of the throttle valve 26 is more than a predetermined value and the transmission is in the neutral mode. Still further, racing can be detected if the opening of the throttle valve is more than a predetermined value and the velocity of the vehicle is substantially zero.

Figure 4:
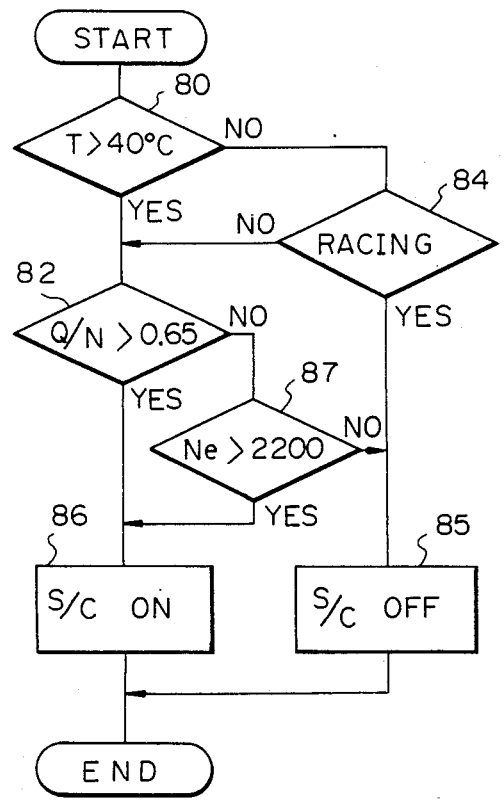
FIG. 4, shows a flow chart for controlling the operation of the supercharger shown in FIG. 1.

FIG. 4 illustrates the flow chart of the program for controlling the operation of the supercharger 28. This flow is executed as an interruption routine carried out at, for example, every eight milliseconds, in the main routine for the control of the fuel injection. The data from the sensors is stored in the control means 50 to execute the fuel injection control, and such data can be used for the control routine shown in FIG. 4. For the fuel injection control, a specific volume of the intake air (or intake air vacuum) is used as a parameter representing the engine load. The specific volume is denoted by the characters Q/N (volume per revolution). When the engine rpm is used for detecting racing, the reference value is set to be a value slightly higher than the rpm when the engine is idling and the engine is also cold.

Figure 5:
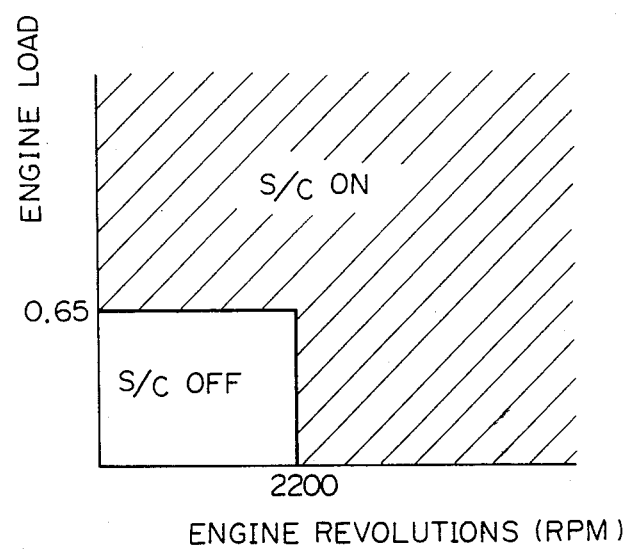
FIG. 5 shows a typical operation zone of the supercharger.

FIG. 5 illustrates a typical operation zone of the supercharger 28 determined in relation to the engine load and rpm. Generally, the supercharger 28 is operated (the electromagnetic clutch 38 is engaged) when the engine load is more than a predetermined value (Q/N is more than 0.65 l/rev in FIG. 5) and when the engine rpm is more than a predetermined value (2,200 rpm in FIG. 5). Therefore, the supercharger 28 is operated during racing if the engine rpm is greater than 2,200 rpm; causing the spark plugs to become wet, as previously stated. The operation of the supercharger 28 is stopped (the electromagnetic clutch 38 is disengaged) when the engine load and rpm are low.

Returning to FIG. 4, step 80 judges if the temperature T of the engine cooling water is above 40° C. The program then goes to step 82 when the judgement is YES, and goes to step 84 when the judgement is NO. If the temperature of the engine cooling water is low, there is a tendency for the fuel to be deposited on the internal wall of the intake air passage 14. Step 84 judges if the engine is racing. If NO at step 84, the program goes to step 82. If YES, the program goes to step 85, where the operation of the supercharger 28 is stopped. When the engine is racing, there is a tendency for both the air and the fuel to flow back toward the throttle valve 26. The flow passing through steps 80, 84, and 85 means that the supercharger 28 is not operated so that the air is not supercharged when the engine temperature is low and the engine is racing, even if the engine rpm exceeds 2,200 rpm. Accordingly, the amount of fuel to be injected is not increased. Therefore, excessive fuel is not left in the intake air passage 14, to make the spark plugs wet. Because the clutch is disengaged when the operation of the supercharger 28 is stopped, the rotors thereof can freely rotate under the flow of air drawn in by the action of the piston 4 in the engine cylinder 2. Where racing is detected by the opening of the throttle valve 26, the operation of the supercharger 28 should remain stopped until the throttle valve 26 is next opened, since a high rpm, of the engine continues for a certain period after the throttle valve is closed.

The flow from step 82 executes the control as illustrated in FIG. 5. At step 82, it is judged if the engine load (Q/N) is more than a predetermined value (0.65 l/rev.). If YES in step 82, the program goes to step 86 to operate the supercharger 28. If NO, the program goes to step 87 which judges if the rpm (Ne) of the engine is more than a predetermined value (2,200 rpm). If YES in step 87, the program again goes to step 86 to operate the supercharger 28. If NO, the program goes to step 85 to stop the operation of the supercharger 28.

As explained above, according to the present invention, the operation of the supercharger 28 is preferentially stopped when the temperature of the engine is low and the engine is racing, so that the spark plugs are not made wet. The supercharger also can be operated as required by the engine operating conditions. In particular, the supercharger can be operated to provide a high engine power when the engine load and rpm are high and the operation of the supercharger can be stopped to save fuel when the engine load and rpm are low.

What is claimed is:

1. In an internal combustion engine having a crankshaft and a supercharger mechanically driven by and connected to said crankshaft via an electromagnetic clutch, a control device for controlling the operation of said supercharger in response to engine operating conditions, comprising, a first sensor means for detecting a temperature of the engine, a second sensor means for detecting racing of the engine, and a control means responsive to outputs from said first and second sensors for causing said electromagnetic clutch to be disengaged, thereby disconnecting the supercharger from the crankshaft when the temperature of the engine is below a predetermined value and the engine is racing.

2. A control device according to claim 1, wherein said supercharger comprises a Roots blower.

3. A control device according to claim 1, wherein said first sensor means detects a temperature of the engine cooling water.

4. A control device according to claim 1, wherein said engine is mounted in a vehicle having a transmission, and wherein said second sensor means comprises a means for detecting the engine rpm and a means for detecting a neutral mode of said transmission so as to detect racing of the engine if the rpm is more than a predetermined value and the transmission is in the neutral mode.

5. A control device according to claim 1, wherein said engine is mounted in a vehicle, and wherein said second sensor means comprises a means for detecting the rpm of the engine and a means for detecting the velocity of the vehicle so as to detect racing of the engine if the rpm is more than a predetermined value and the velocity of the vehicle is substantially zero.

6. A control device according to claim 1, wherein the engine is provided with a throttle valve in an intake air passage thereof and is mounted in a vehicle having a transmission, and wherein said second sensor means comprises a means for detecting the opening degree of the throttle valve and a means for detecting a neutral mode of the transmission so as to detect racing of the engine if the opening of the throttle valve is more than a predetermined value and the transmission is in a neutral mode.

7. A control device according to claim 1, wherein the engine is mounted in a vehicle and is provided a throttle valve in an intake air passage thereof, and wherein said second sensor means comprises a means for detecting the velocity of the vehicle and a means for detecting the opening degree of the throttle valve so as to detect racing of the engine if the opening of the throttle valve is more than a predetermined value and the velocity of the vehicle is substantially zero.

* * * * *